US008566302B2

(12) United States Patent
Roth

(10) Patent No.: US 8,566,302 B2
(45) Date of Patent: Oct. 22, 2013

(54) WEBSITE SUBMISSION SECURITY MONITOR

(76) Inventor: Jason Todd Roth, Orlando, FL (US)

( * ) Notice: Subject to any disclaimer, the term of this patent is extended or adjusted under 35 U.S.C. 154(b) by 2089 days.

(21) Appl. No.: 11/167,452

(22) Filed: Jun. 27, 2005

(65) Prior Publication Data

US 2005/0289034 A1 Dec. 29, 2005

Related U.S. Application Data

(60) Provisional application No. 60/583,028, filed on Jun. 25, 2004.

(51) Int. Cl.
*G06F 17/30* (2006.01)
(52) U.S. Cl.
USPC .............................................. 707/707; 726/1
(58) Field of Classification Search
None
See application file for complete search history.

(56) References Cited

U.S. PATENT DOCUMENTS

| 5,949,876 A * | 9/1999 | Ginter et al. ..................... 705/80 |
| 2002/0087472 A1* | 7/2002 | Walter ............................. 705/41 |
| 2003/0041020 A1* | 2/2003 | Kogler et al. .................... 705/38 |
| 2003/0055737 A1* | 3/2003 | Pope et al. ....................... 705/26 |
| 2003/0120498 A1* | 6/2003 | Villapudua ....................... 705/1 |

* cited by examiner

*Primary Examiner* — Dinku Gebresenbet
(74) *Attorney, Agent, or Firm* — McKinney Law, PLLC

(57) ABSTRACT

Consumer data that is submitted through a company's website is tagged and then monitored to assure that the consumer data is not used for unauthorized purposes. A filtering program is capable of identifying pre-authorized users and routing the consumer data only to those pre-authorized users. A banner logo or seal is used to identify websites that comply with pre-determined standards for maintaining the security and privacy of website submissions. The banner logo or seal is automatically removed from a company's website for the failure of the company to maintain compliance with security and privacy standards of consumer data.

12 Claims, 6 Drawing Sheets

Name

Street Address

City

State

Zipcode

Phone

Email

Comments or suggestions:

Send

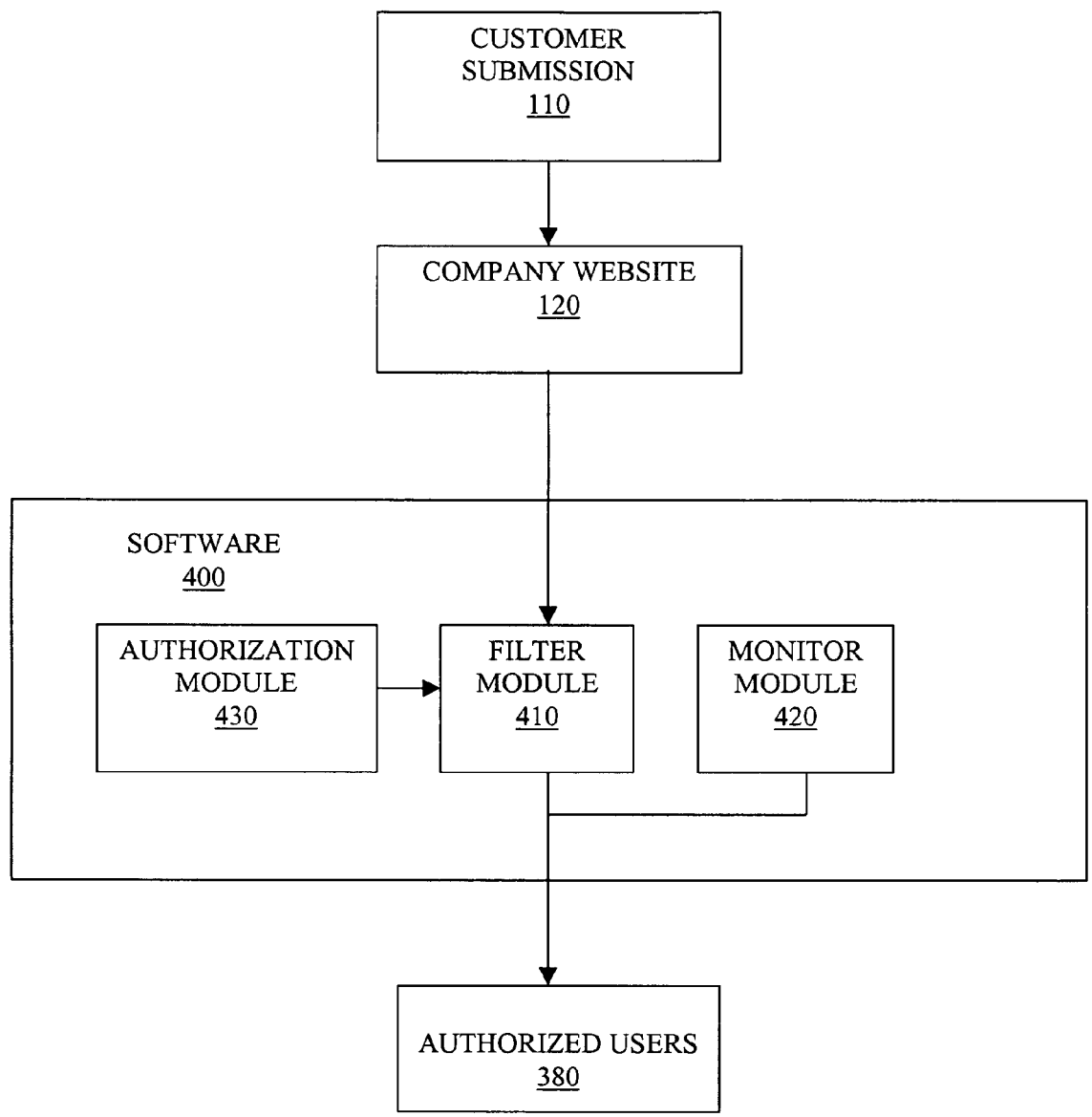

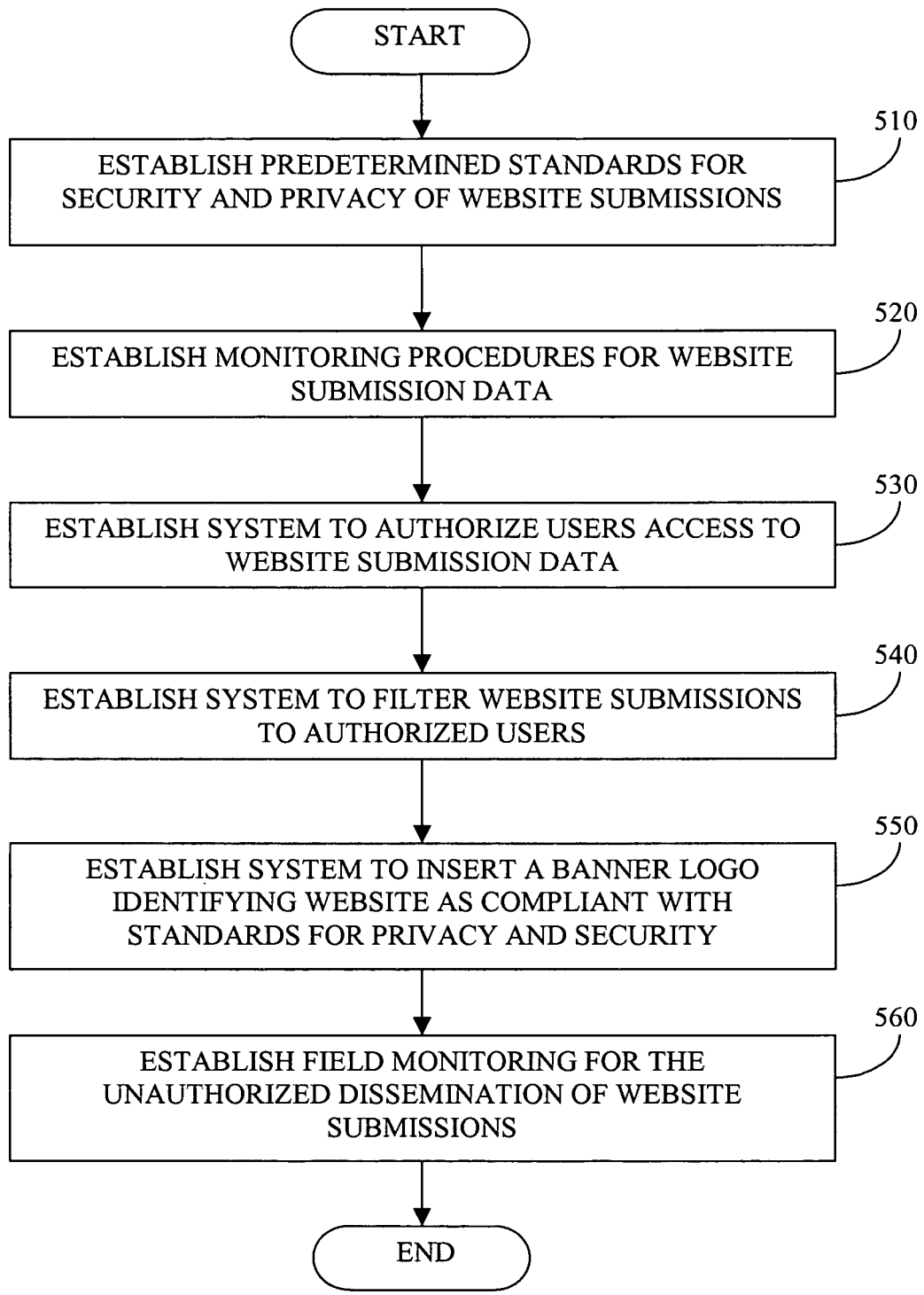

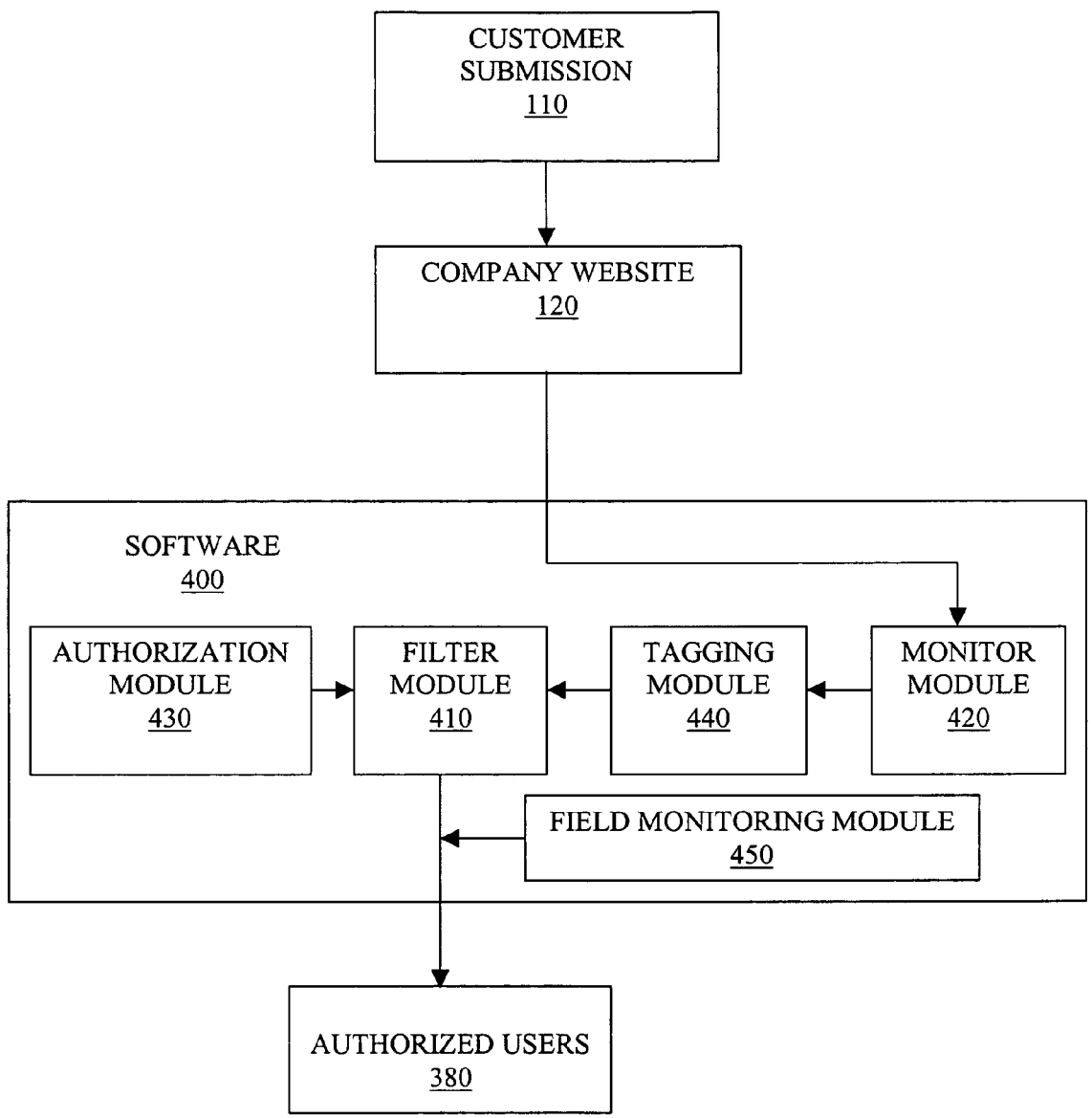

WEBSITE SUBMISSION SECURITY MONITOR

CROSS-REFERENCED TO RELATED APPLICATIONS

This application claims the benefit of U.S. Provisional Application No. 60/583,028 filed Jun. 25, 2004. The disclosure of the provisional application is incorporated herein by reference.

BACKGROUND OF THE INVENTION

1. Field of the Invention

The present invention relates generally to websites, and more specifically to techniques to increase the security and privacy of personal information submitted through websites.

2. Description of the Prior Art

The Internet is used by millions to shop for information or to purchase goods and services. The technological advances in using the Internet in ecommerce has included the ability of companies to collect and store information about the consumers that visit a company's website. The Internet provides a commercial relationship between businesses and their respective consumers. As part of that relationship between a business that offers goods or services on the Internet, a consumer may be required to submit their email address or other personal information. Many consumers have a lack of confidence in the ability of the website to maintain their personal information private once submitted. This apprehension has resulted in lost ecommerce sales.

As the Internet was becoming more popular to use, companies would track emails and simply log the results into marketing databases. This led to the sharing and selling of consumer information without the knowledge or consent of the consumers or unauthorized persons gaining access to such marketing databases.

Encryption was one of the first techniques designed to maintain the security and privacy of consumer information. This helped to impede computer hackers from the unauthorized retrieval and access to consumer information or to otherwise intercept communications in transit. An example of encryption is SSL Secure websites. SSL stands for "Secure Sockets Layer". It is a protocol designed to enable applications to transmit information back and forth securely. Applications that use this protocol inherently know how to give and receive encryption keys with other applications, as well as how to encrypt and decrypt data sent between the two.

Some applications that are configured to run SSL include web browsers like Internet Explorer and Netscape, email programs like GroupWise, Outlook, and Outlook Express, SFTP (secure file transfer protocol) programs, etc. These programs are automatically able to receive SSL connections. However, SSL does not consider the internal accessibility of a database and the privacy or unauthorized sharing of consumer information once submitted to a website.

Accordingly, what is needed in the art are techniques for improving the security of personal information submitted through websites that overcomes the limitations of prior art techniques and that is a significant contribution to the advancement of the security and privacy of consumers information.

However, in view of the prior art at the time the present invention was made, it was not obvious to those of ordinary skill in the pertinent art how the identified needs could be fulfilled.

SUMMARY OF THE INVENTION

The invention provides for improved security techniques for submissions of personal information through Internet websites by consumers. One embodiment of the invention comprises computer software that monitors and inspects a company's procedures by reviewing and monitoring certain data submitted and transmitted through a company's website. The invention determines where specific data is routed. For example, if the data is email data then it is monitored to confirm that the data was in fact only routed to the authorized user for processing by that company. Likewise, if the website submission data is purchasing data, then that data is monitored to confirm that the data was in fact routed to the authorized user for processing. The invention would include monitoring any data that is forwarded to the company's affiliated partners, subsidiaries, or other third parties.

Once the routing of the consumer's data is determined through the passive monitoring process, the invention will assess whether the routing process generally complies with predetermined standards. If a company does not meet the predetermined standards, then the company is notified of the areas that require improvement to come into compliance with the predetermined standards.

If a company's routing of a consumer's data is approved by the monitoring module as being in substantial compliance with the predetermined standards, then filter, authorization and tagging modules are installed on the company's computer system. The filtering module accepts all consumer information that is submitted through a company's website. The filtering module determines whether any of the data should be routed to authorized users and if so the filter module also determines which authorized users.

The filtering module is in communication with a tagging module that assigns a code to the consumer data. The code is a unique tag for each entry before it is routed to authorized users. The unique tag is comprised of a number, letter, or symbol code, for example. The tag is transparent and not detectable by normal users. The tag that is underlying each entry of a consumer's data is unique for that particular entry so that if a consumer's name entry is otherwise segregated from her address entry, for example, the name entry will retain its unique tag. Each unique tag is capable of retaining its origin of the consumer data for tracking and monitoring purposes. The tagging of the consumer data is not a security tag but rather the invention is actively assigning a unique code on the fly to each consumer data entry that is submitted via website.

The monitoring module can determine whether any of the incoming data, once tagged, is routed to unauthorized sources and otherwise comprising a breach in the security and privacy of the data. Any data that is not routed to an authorized user is held in a storage device such as a disk drive until such time that an authorized user is designated as a proper recipient.

In addition, once the filtering module is in operation and has access to a company's internal conduit of information of website submissions, the company's website is provided with a banner logo or seal to identify that any information submitted to the website will not be shared, sold, or otherwise provided to any entity that is not pre-authorized.

To continue to monitor that consumer information is not being disseminated to unauthorized users, a field monitoring module is used with the present invention. The field monitoring program confirms that the company continues to comply with the pre-determined standards regarding maintaining the security and privacy of website submission data. The pre-determined standards are namely that the company maintains a secure environment for the consumer information and does not disseminate the information without the consumer's consent. If the company fails to comply with the pre-determined standards or if a website otherwise becomes unsafe for a consumer to submit his or data through the website, the banner logo or seal is automatically removed from the company's website that previously designated the website as being secure to make website submissions.

In another embodiment of the invention, a consumer's information submitted through the company's website is routed first to the monitoring module where it is tagged with a unique code or tag. The tagged data is then routed to the company's electronic storage device or a relational database where it is routed to pre-authorized users by the filtering module of the present invention. If it is determined by the field monitoring module that the tagged data is being used for unauthorized purposes, then the banner logo or seal is automatically removed from the website that previously designated the website as being operated by a company that does not share or sell consumer's personal information. For example, often times a consumer receives unsolicited email advertisements. The present invention can determine the origin of where the sender of the unsolicited email advertisement obtained the consumer's data (i.e., which website submission) by the unique tag described above.

A primary object of the invention is to provide techniques to improve security of consumer data submitted through websites.

Another very important object of the invention is to provide techniques to monitor the dissemination of consumer data submitted through a website.

Another important object of the invention is to provide techniques to promote a consumer friendly environment on the Internet for ecommerce.

Still another very important object of the invention is to define techniques for identifying websites that provide increased security and privacy of consumers' information.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 2 illustrates a graphical user interface commonly used on websites for a consumer to submit his or her personal data to a company;

FIG. 4. is a block diagram of computer software which may be employed in the computer system of FIG. 3, according to the preferred embodiments of the present invention;

FIG. 5. provides a flowchart illustrating logic that may be used to implement a website submission security monitoring system according to preferred embodiments of the present invention; and FIG. 6. is a block diagram of computer software which may be employed in the computer system of FIG. 3, according to an alternative embodiment of the present invention.

DETAILED DESCRIPTION OF THE PREFERRED EMBODIMENT

Figure 1:
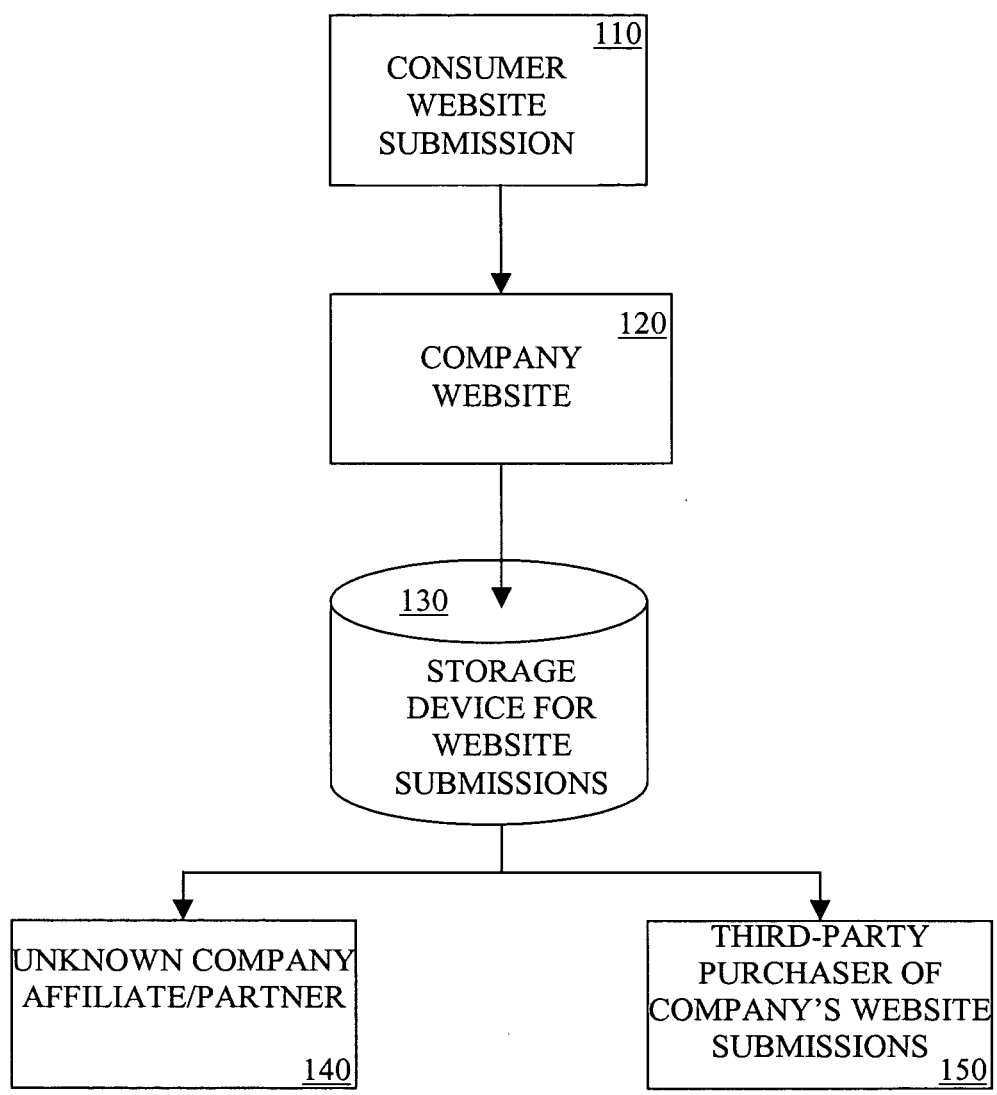
FIG. 1 is a block diagram of a common model that is used to disseminate a consumer's data submitted through a company's website without any security or privacy protection to the consumer according to the prior art.

The present invention discloses techniques to improve the privacy and security of website submissions that are often sold or shared with third party's without the consumer's consent or knowledge as illustrated by FIG. 1. A consumer visits a company's website 120 and is requested to submit personal information through the website 120. The consumer provides the requested information through a consumer website submission 110. The data is submitted through a website typically using a graphical user interface 200 as shown in FIG. 2. Referring now to FIG. 1, an on-line consumer may be required to submit information through a company's website 120 to receive information, be placed on a mailing list, complete a registration, or complete a transaction. The consumer's information that is required to be submitted usually consists at a minimum, his or her name, email address, mailing address, phone number and other personal data. The consumer website submission 110 is accepted and electronically stored in a storage device 130. The storage device 130 may comprise a database, for example, or computer flat file, hard disks, optical storage devices and the like.

After the consumer makes a website submission 110 he or she has no control over how that data is used. Often times the data submitted through a company's website 120 is disseminated to third party companies 140 that are unknown to the consumer who made the website submission 110. The consumer website submissions may be purchased by another company 150 and used for marketing purchases, for example.

Figure 3:
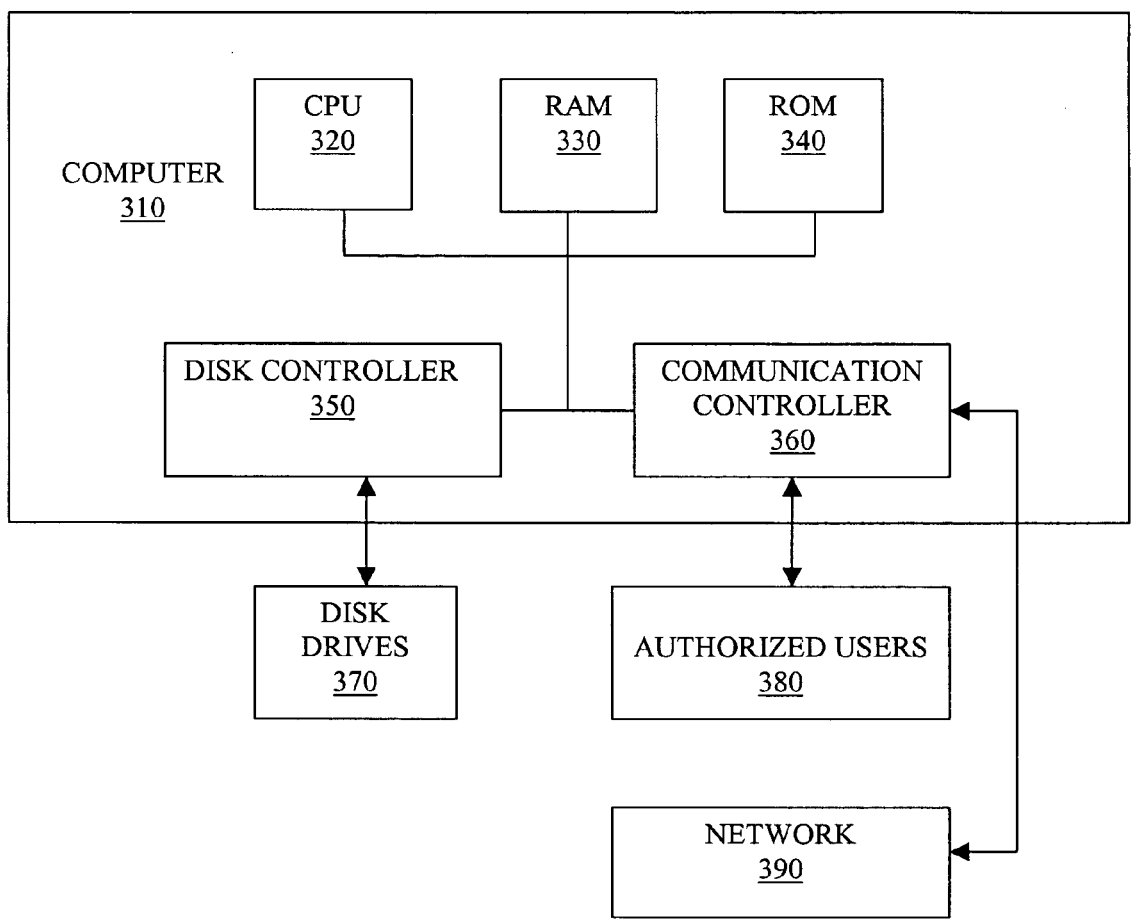
FIG. 3 is a block diagram of a computer system that may be employed in the present invention.

A computer 310 that may be used in the present invention is shown in FIG. 3. Computer 310 may be configured in a number of different forms for accepting input, processing the input according to specified instructions, and outputting the processing results, as is well known in the art. Computer 310 may be, for example, a personal computer, a workstation, a supercomputer, a mainframe computer, a minicomputer, a handheld computer, a wearable computing device, a personal digital assistant ("PDA"), a smart appliance in the home, and so forth. By way of example, computer 310 may function as a server in a client/server architecture in a networking environment; alternatively, computer 310 may be a client device in a client/server architecture, a device operating within another networking environment, or a stand-alone device not operating within a networking environment.

In accordance with the preferred embodiment of the present invention, a computer 310 preferably includes a central processing unit ("CPU") 320, a random access memory ("RAM") 330, a read-only memory ("ROM") 340, a disk controller 350 and a communication controller 360.

CPU 320 is preferably one of the Intel families of microprocessors, one of the Advanced Micro Devices, Inc. families of microprocessors, one of the Motorola families of microprocessors, or one of the various versions of a Reduced Instruction Set ("RISC") microprocessor such as the PowerPC® chip manufactured by IBM. In preferred embodiments, ROM 340 stores various controlling programs such as Basic Input-Output System ("BIOS") developed by IBM. RAM 330 is preferably used for loading an operating system and selectively loading controlling programs and/or application programs.

Disk controller 350 may be an aggregate of controllers for facilitating interaction between CPU 320 and disk drives 370 and/or other types of data storage devices. Disk drive 370 is generally representative of a hard drive, floppy disk drive, compact-disk ("CD") drive, etc. Preferably, an operating system (which in preferred embodiments is a conventional operating system such as AIX® from IBM or Windows® from Microsoft Corporation) is stored on a disk drive 370, for loading into memory 214.

Communication controller 360 may be an aggregate of controllers for facilitating interaction between CPU 320 and a network 390. According to preferred embodiments, communication controller 360 also facilitates interaction between CPU 320 and remote authorized users 380.

Those of skill in the art will recognize that the components depicted in FIG. 3 are provided by way of example and are not intended to limit the present invention.

Referring now to FIG. 4, software 400 is illustrated. Software 400 preferably comprises one or more modules written in an object-oriented language, and executes on computer 310 of FIG. 3 to provide a website submission security monitoring routine (shown in FIG. 5) under control of an operating system. The modules comprising software 400 may be physically stored within one or more fixed or removable computer-readable media that is electrically, magnetically, optically, chemically, or otherwise altered to store computer-readable program code, where this media is readable by a device such as disk drive 370.

In other embodiments of computer 310, software 400 may be stored in one or more other computer-readable media, such as a CD-ROM disk. Alternatively, software 400 or portions thereof may be downloaded to RAM 330 via network 390. In other embodiments of computer 310, software 400 can be partially or fully implemented with digital circuitry, analog circuitry, or a combination thereof.

The authorized users database 380 is preferably stored on one or more local or remote storage devices 370, and interacts with software 400 during operation of the website submission security monitoring techniques disclosed herein.

In preferred embodiments, software 400 includes an authorization module 430, a filter module 410, and a monitor module 420 for determining whether website submissions are being disseminated according to predetermined security and privacy standards. In one embodiment of software 400, the authorization module 430, filter module 410 and monitor module 420 (collectively, the "Modules") incorporate a Structured Query Language ("SQL") interface. An execution of the Modules under control of the operating system facilitates storage of website submission data, predetermined security and privacy standards, monitoring of the dissemination of the website submission data within disk drives 370 and other operations on this data (such as retrieving, querying, etc.), as will be obvious to one of skill in the art.

FIG. 5 provides a flow chart illustrating logic that may be used to implement preferred embodiments of website submission monitoring. As shown in FIG. 5, predetermined standards for security and privacy of website submissions are established 510. This establishment process may comprise identifying and mapping the authorized dissemination of website submission data. Monitoring procedures 520 are established in furtherance of determining compliance with the predetermined standards for security and privacy of website submissions. A system must be established to authorize users access to website submissions 530. As website submission data is submitted to a company, a system is established to route or filter the website submissions to the authorized users 540.

Subsequent to those systems being established (510, 520, 530 and 540), a system is established to identify a website to a consumer as being complaint with the predetermined standards 550 by a logo banner, for example. The consumer can then be assured that any website submissions made through a company's website identified as being complaint with security and privacy standards, that his or her website submission will not be disseminated to unauthorized entities. A system is also established to field monitor a company identified on its website as being compliant with the predetermined security and privacy standards 560 so that the company continues to follow those standards in the dissemination of website submission data.

Referring now to FIG. 6, in an alternative embodiment, software 400 includes an authorization module 430, a filter module 410, a tagging module 440, and a monitor module 420 for determining whether website submissions (e.g., consumer data) are being disseminated according to predetermined security and privacy standards. Website submissions are first routed to the monitor module 420 then routed through a tagging module 440 where each website submission is electronically tagged with a unique code. The website submission may comprise more than one entry. For example, a submission may comprise the three entries of (1) the name, (2) address, and (3) phone number of a consumer. Each entry has its own unique code or tag. The tagged website submission is next sent to the filter module 410 to disseminate the tagged website submissions to users that are deemed to be authorized users 380 by the authorization module 430. The website 120 is uniquely identified in some manner such as a logo banner that any website submission 110 made through the website 120 will be maintained in accordance with predetermined security and privacy standards 510. Subsequently, if the tagged website submissions are determined by the field monitoring module 450 as being disseminated to unauthorized users then the unique identification on the company's website 120 is removed.

As will be appreciated by one of skill in the art, embodiments of the present invention may be provided in various forms, including methods, systems, or computer program products. Accordingly, the present invention may take the form of an entirely hardware embodiment, an entirely software embodiment, or an embodiment combining software and hardware aspects. Furthermore, the present invention may take the form of a computer program product that is embodied on one or more computer-readable storage media (including, but not limited to, disk storage, CD-ROM, optical storage, and so forth) having computer-readable program code embodied therein.

The present invention has been described with reference to flow diagrams and/or block diagrams of methods, apparatus (systems), and computer program products according to preferred embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flow diagram flow or flows and/or block diagram block or blocks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall therebetween.

Now that the invention has been described,

What is claimed is:

1. A method for preventing unauthorized dissemination of customer website submissions, the method comprising:
    establishing predetermined standards that identify when customer website submissions are provided to third parties;
    determining when a website is in compliance with the predetermined standards;
    tagging each entry of a customer website submission with a unique code when the customer website submission is submitted to the website;
    filtering customer website submissions only to a third party when the third party is in compliance with the predetermined standards; and
    identifying the website to a customer as complying with the predetermined standards.

2. The method of claim 1, wherein the predetermined standards include that the customer website submissions cannot be disseminated to any unauthorized third party.

3. The method of claim 1 further comprising monitoring the customer website submissions to determine when the predetermined standards are violated by one of the website and third party.

4. The method of claim 1 further comprising authorizing the third party to access the customer website submissions when in compliance with the predetermined standards.

5. The method of claim 1 further comprising field monitoring of compliance by the website with the predetermined standards by using the unique code to determine an origin of an unsolicited email advertisement.

6. The method of claim 1, wherein the unique code is used to identify the website where the entry of the customer website submission was submitted to determine from where the customer website submission was disseminated.

7. A computer program product, which stores on a non-transitory computer-readable medium of a computer system instructions for execution on a computer system for preventing unauthorized dissemination of customer website submissions, the instructions when executed by a hardware processor of the computer system causes the hardware processor to:
    establish predetermined standards that identify when customer website submissions are provided to third parties;
    determine when a website is in compliance with the predetermined standards;
    tag each entry of a customer website submission with a unique code when the customer website submission is submitted to the website;
    filter customer website submissions only to a third party when the third party is in compliance with the predetermined standards; and
    identify the website to a customer as complying with the predetermined standards.

8. The computer program product according to claim 7, wherein the predetermined standards include that the customer website submissions cannot be disseminated to any unauthorized third party.

9. The computer program product according to claim 7, further comprising instructions to monitor the customer website submissions to determine when the predetermined standards are violated by one of the website and third party.

10. The computer program product according to claim 7, further comprising instructions to authorize the third party to access the customer website submissions when in compliance with the predetermined standards.

11. The computer program product of claim 7, further comprising instructions to field monitor for compliance by the website with the predetermined standards by using the unique code to determine an origin of an unsolicited email advertisement.

12. The computer program product according to claim 7, wherein the unique code is used to identify the website where the entry of the customer website submission was submitted to determine from where the customer website submission was disseminated.

* * * * *